May 2, 1950   L. J. KOCI   2,506,272
COMBINATION STARTING AND OVERLOAD PROTECTIVE RELAY
Filed April 11, 1945   3 Sheets-Sheet 1

INVENTOR.
Ludvik J. Koci
BY
McCanna & Morsbach
Attys.

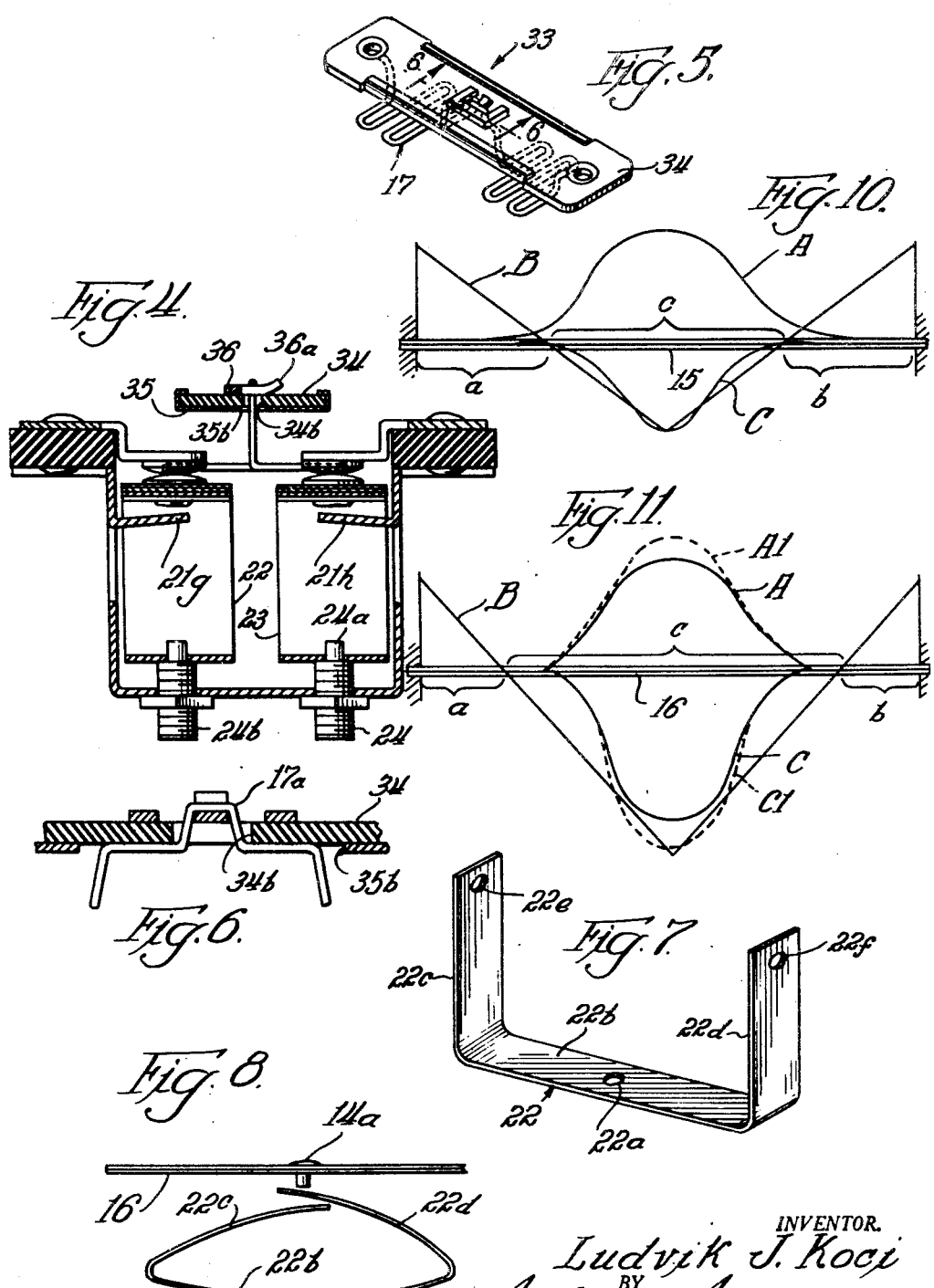

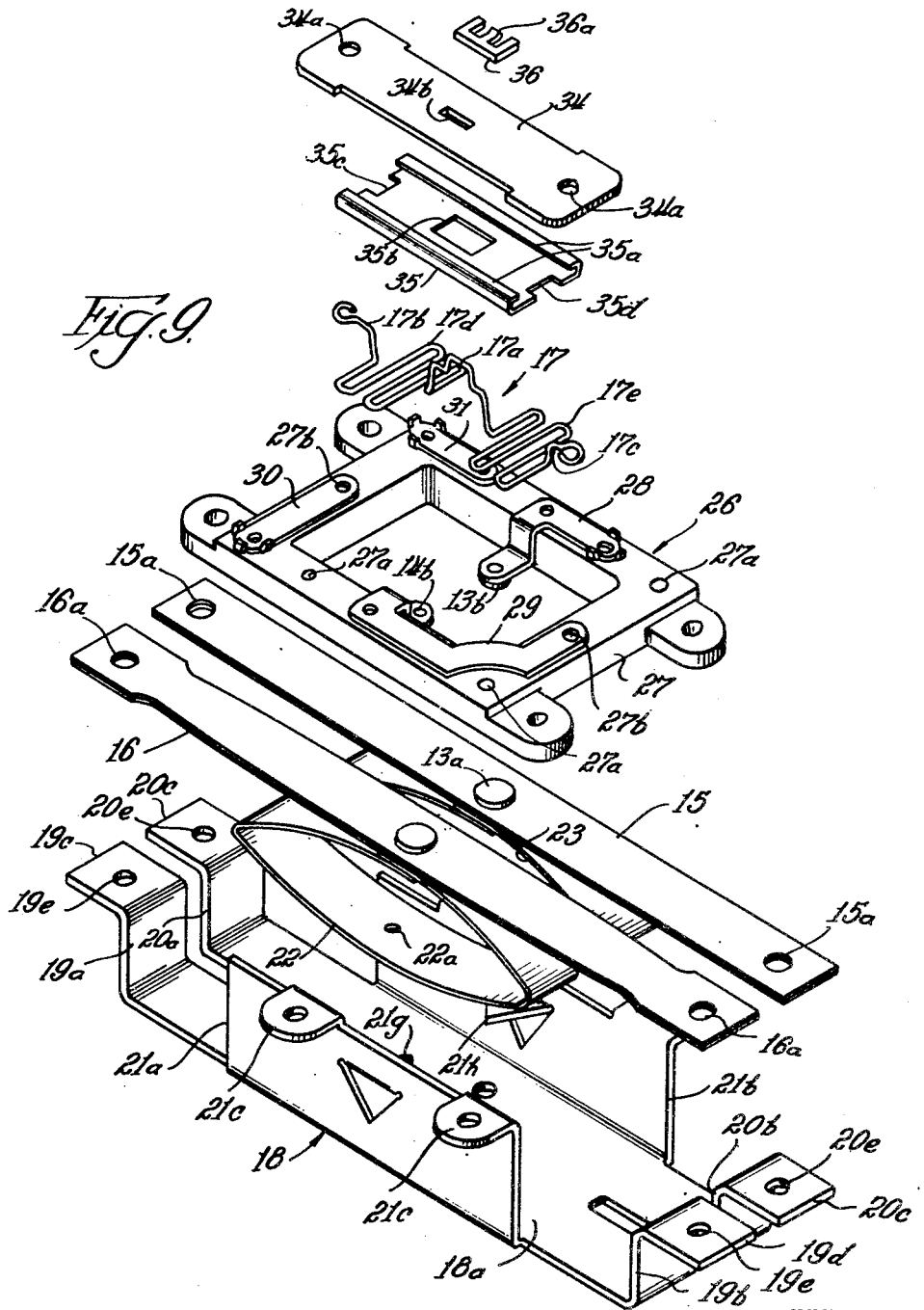

Patented May 2, 1950

2,506,272

UNITED STATES PATENT OFFICE 2,506,272

COMBINATION STARTING AND OVERLOAD PROTECTIVE RELAY

Ludvik J. Koci, Riverside, Ill., assignor to Sunbeam Corporation, Chicago, Ill., a corporation of Illinois Application April 11, 1945, Serial No. 587,805

7 Claims. (Cl. 200—122)

The present invention relates to an improved combination starting and overload relay for controlling the starting of a motor having a starting winding, such, for example, as a split phase alternating current motor, and for protecting the motor against damage occasioned by overloads that may be imposed thereon.

It is conventional practice to provide starting windings in single phase alternating current motors for the purpose of developing rotor torque during starting. It is also common practice to employ some form of automatic switching device for cutting out the starting winding after a motor of this type is once started and attains a predetermined operating speed. In certain motor applications, such, for example, as refrigerators, where the motor forms a part of a sealed unit, it is also accepted practice to provide some form of protective device, usually thermostatic, for protecting the motor windings against damage due to excessive temperature rise caused by overloads. In general, thermostatic timing devices have not been acceptable for performing the starting winding cutout operation, due to the erratic timing provided by cheap uncompensated devices of this type and the expense involved in manufacturing a device of this character sufficiently well compensated against ambient temperature changes to provide for timing of the motor starting period with acceptable uniform accuracy. Hence, separate devices are usually provided to perform the two control functions, i. e. some form of centrifugal device, responsive to speed, is employed for motor starting control, and a separate temperature responsive device is provided to perform the protective function. As a result, considerable expense is involved in providing the requisite control devices for starting and protecting a motor of the character described.

It is an object of the present invention, therefore, to provide a simple and improved combination starting and overload relay for protecting and controlling the starting of a motor equipped with a starting winding.

It is another object of the invention to provide a relay of the character described, utilizing heater controlled thermostatic elements for both starting and overload cutout control, in which time lag in the response of the thermostatic elements to changes in the current traversing the heater is minimized.

According to a further object of the invention, an improved, simple and negligible power consuming arrangement is provided in the relay for rendering the response of the thermostatic motor starting control element substantially independent of ambient temperature changes, thereby to provide for reliably uniform timing of the motor starting period.

In accordance with a still further object of the invention, an improved and exceedingly simple arrangement is provided for rendering the thermostatic overload control element of the relay jointly responsive to ambient temperature changes and the magnitude of the current delivered to the controlled motor, thereby to provide for a response of this element which is accurately related to the temperature of the motor windings.

More generally, it is an object of the invention to provide a combination relay of the character described which may be readily adapted to control motors having widely different ratings and operating characteristics by utilizing different heater assemblies therein, all other parts of the relay structure remaining the same.

It is another object of the invention to provide an improved thermostatic control device which operates with a very small power consumption and with no frictional engagement between the relatively movable parts thereof.

It is yet another object of the invention to provide an improved thermostatic control device in which a frictionless spring biasing arrangement of novel structure is utilized to determine the operating point of the thermostatic element.

It is a still further object of the invention to provide for use in a thermostatic device of the character described, an improved and simple heater assembly for accurately holding a heating element in a set position relative to the thermostatic element or elements.

The invention, both as to its organization and method of operation, together with further objects and advantages thereof, will best be understood by reference to the following specification taken in connection with the accompanying drawings, in which:

Fig. 4 is a sectional view taken along the lines 4—4 in Fig. 2;

Fig. 5 is an elevational view illustrating the heater assembly provided in the relay;

Fig. 6 is an enlarged fragmentary sectional view taken along the lines 6—6 in Fig. 5;

Fig. 7 is an elevational view illustrating the configuration of the thermostatic element biasing springs prior to assembly;

Fig. 8 is a fragmentary detail view illustrating the mode of assembly of one of the biasing springs with one of the thermostatic elements;

Fig. 9 is an exploded view in perspective illustrating all parts of the relay in their relative positions prior to assembly;

Fig. 10 is a graph illustrating the operating characteristics of one of the thermostatic elements embodied in the relay; and Fig. 11 is a graph illustrating the operating characteristics of the other thermostatic element embodied in the relay.

Figure 1:
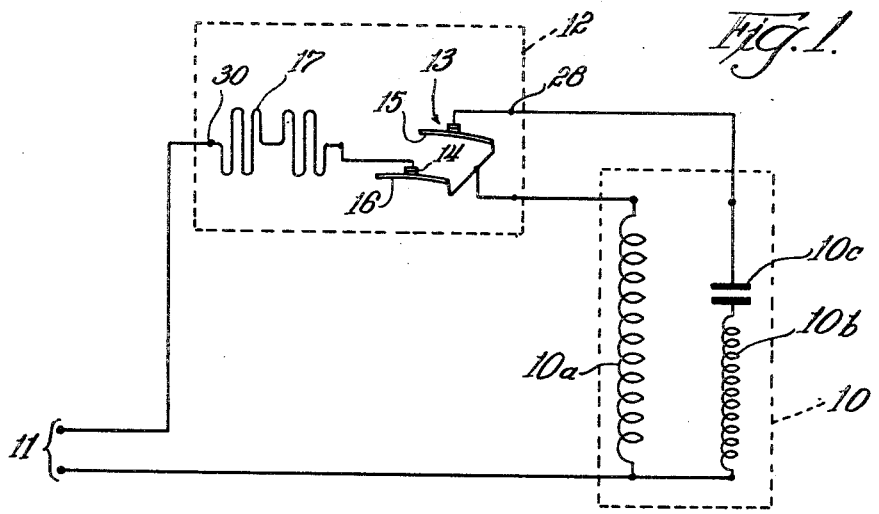
Fig. 1 is a circuit diagram schematically illustrating the manner in which the present improved combination starting and overload relay is utilized to control an alternating current motor of the split-phase type.
Figure 2:
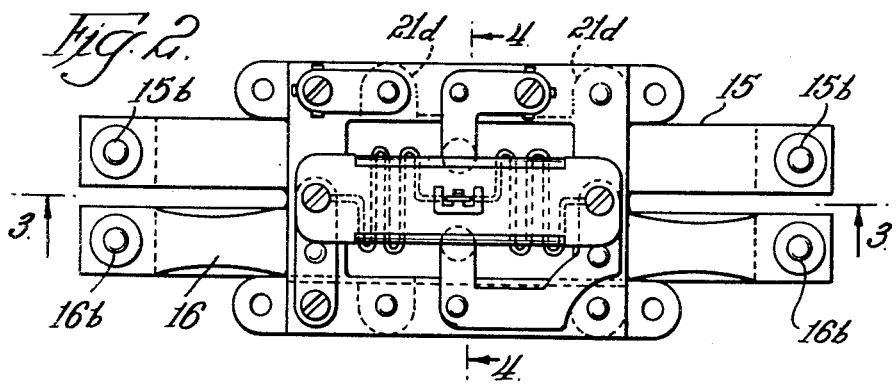
Fig. 2 is a top plan view of the relay schematically shown in Fig. 1.
Figure 3:
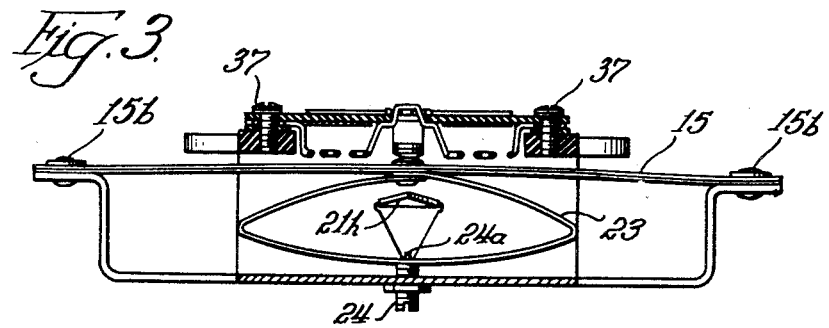
Fig. 3 is a sectional view taken along the lines 3—3 in Fig. 2.

Referring now to the drawings, and more particularly to Fig. 1 thereof, the present improved combination starting and overload relay is there illustrated generally at 12 in its use to control a single phase alternating current motor 10 to which current may be delivered from any suitable alternating current source indicated by the bracketed terminals 11. The motor 10 is of the conventional split-phase type being provided with the usual running winding 10a, which is alone energized after the motor is brought up to its normal operating speed, and with a starting winding 10b, which, in conjunction with the series connected condenser 10c, is utilized to produce the rotating field component required to produce rotor torque during starting.

In general, the relay 12 is provided to open the circuit through the starting winding 10b of the motor after the motor is brought up to speed, to hold this circuit open so long as the motor continues to operate, to reclose this circuit when motor operation is discontinued, and also to open the circuit through the running winding 10a of the motor in response to a predetermined temperature rise of the motor windings. To this end, the relay 12 is provided with a pair of normally engaged starting winding cutout contacts 13 which are serially included in the circuit for energizing the motor starting winding 10b and are controlled by a bimetal thermostatic element 15 to open this circuit a predetermined time interval after the motor is energized. Overload protection is provided by a pair of normally engaged overload cutout contacts 14 which are serially included in the energizing circuits for both the starting and running windings of the motor and are controlled to open these circuits by a second bimetal thermostatic element 16 when a predetermined temperature rise in the motor windings is indicated. Movement of the two thermostatic elements to perform the described control functions is effected through the action of an electric heating element 17, common to the two elements, and energized by the full current delivered to the motor 10 from the source 11.

As indicated above, under normal operating conditions, the starting period for the motor 10 remains substantially constant as between successive motor starting operations. Accordingly, the cutout of the starting winding 10b may conveniently be effected on a time basis. Measurement of this motor starting interval must, however, be accurate and independent of ambient temperature changes. The temperature of the motor windings, on the other hand, is a function of both the ambient temperature of the atmosphere surrounding the motor and the magnitude of current flow through the windings. Hence, the overload cut-off function assigned to the contacts 14 and the thermostatic element 16 should properly take both of these factors into account. In accordance with the present invention, these ends are achieved by providing the thermostatic elements 15 and 16, the first of which is fully self compensated against response to ambient temperature changes, in a wholly simple manner, and the second of which is responsive to ambient temperature changes as well as the current traversing the heating element 17.

Structurally, the present improved relay is of the novel form illustrated in Figs. 2 through 9 of the drawings. As there shown, all parts of the relay are carried by supporting means in the form of a supporting member 18 which is provided with a base portion 18a and three sets of laterally extending supporting parts 19, 20 and 21. The two thermostatic elements 15 and 16 are arranged in side-by-side relationship and span the gaps between the opposed supporting parts 19a, 19b and 20a, 20b making up the two sets arranged longitudinally of the member 18. Specifically, these elements are in the form of flat, normally straight bi-metallic strips, having their high coefficient of expansion sides disposed toward the base 18a. They are apertured at each end as indicated at 15a and 16a to receive mounting rivets 15b and 16b which are utilized in mounting the elements upon the supporting member 18. More specifically, the rivets 15b are extended through openings 20e in the horizontally aligned ears 20c of the supporting legs 20a and 20b, and are peened over to provide a rigid connection between each end portion of the thermostatic element 15 and the associated supporting leg of the member 18, thereby to restrain these end portions of the element against both angular and lateral movement for the purpose more fully explained below. In order to provide for snap acting over center movement of the mid-portion of this element from its normal closed circuit position to its open circuit setting when a predetermined temperature gradient is produced therealong, the distance between the centers of the openings 15a is made slightly greater than the distance between the centers of the openings 20e, so that during assembly of the element upon the supporting member 18 it is stressed longitudinally to bow the element upwardly away from the base 18a. In a similar manner, the rivets 16b are extended through openings 19e in the horizontal aligned ears of the supporting legs 19a and 19b, and peened over to provide rigid connections between the end portions of the thermostatic element 16 and the supporting member 18. These connections are of such rigidity as to appreciably restrain the end portions of the element 16 against both angular and lateral movement regardless of any temperature gradient therein or between these portions of the strip and the intermediate portions thereof. Here also, the distance between the centers of the rivet openings 16a is slightly greater than the distance between the associated openings 19e, in order longitudinally to stress the element 16 and thus provide for accelerated over center movement of the mid-portion thereof between its closed circuit and open circuit positions. For the purpose of rendering the element 16 jointly responsive to ambient temperature changes and the magnitude of current traversing the heating element 17, the width of the element 16 is decreased from the mid-portion thereof toward each end in the manner best illustrated in Fig. 9 of the drawings.

As will be evident from the preceding description, lateral deflection of the mid-portions of the two thermostatic elements 15 and 16 is utilized to control the contacts 13 and 14, respectively. To this end, the movable contact 13a of the contact pair 13 is mounted at the exact center of the strip 15 and the movable contact 14a of the contact pair 14 is mounted at the exact center of the thermostatic element 16. Stops 21g and 21h struck out from the sides of the supporting member 18 are utilized to limit downward movement of the mid-portions of the thermostatic elements. To provide for adjustment of the operating point or temperature gradient characteristic at which each of the two thermostatic elements 15 and 16 is operated between its closed and open circuit positions, there are provided in accordance with a specific feature of the invention frictionless biasing springs 23 and 22 of approximate elliptical form which are adjustably stressed transversely of the lengths thereof between the mid-portions of the thermostatic elements 15 and 16, respectively, and the base 18a of the supporting member 18 by means of biasing adjusting screws 24 and 24b threaded through the base 18a of the supporting member. The biasing assemblies are of identical arrangement and as shown in Fig. 7, the spring 22 associated with the thermostatic element 16 is, prior to assembly, of U-shaped form, being provided with a base portion 22b apertured at 22a to receive the shouldered end 24a of the adjusting screw 24. The side legs 22c and 22d of this spring are apertured at their ends as indicated at 22e and 22f to receive the shank of the contact element 14a. In the assembly of the relay, the spring 22 is pre-assembled with the thermostatic element 16 prior to assembly of this element upon the supporting member 18. To this end, the legs 22c and 22d of the spring are folded toward each other to bring the apertures 22e and 22f into alignment for reception of the shank of the contact element 14a in the manner illustrated in Fig. 8 of the drawings. Following this operation, the extended end of the contact element shank is peened over rigidly to support the spring upon the mid-portion of the thermostatic element at the underside thereof. As the spring 22 is thus stressed, it assumes the approximate elliptical form best illustrated in Fig. 3 of the drawings, so that when engaged by the end of the screw 24 it imposes a force upon the mid-point of the thermostatic element tending to restrain the contacts 14 in engagement and to resist downward deflection of this portion of the thermostatic element when a temperature gradient is produced along the element.

It is specifically noted that there are no sliding or points of frictional engagement between the spring 22, the supporting member 18 and the thermostatic element 16. This arrangement is to be distinguished from conventional coil and leaf spring biasing structures in which sliding contacts are provided between the biasing element and the other parts of the structure. Such prior art biasing assemblies necessarily include as a factor of the biasing force, the coefficient of friction between the slidably engaged parts. This factor is essentially unpredictable and may vary widely depending upon the condition of the device in which the biasing assembly is provided. Due to variations in this factor, erratic performance of the device is obtained. With the improved biasing arrangement described above, however, wherein sliding contacts are entirely eliminated, this objectionable feature of prior art biasing assemblies is entirely obviated.

The heating element 17 and the stationary contacts 13b and 14b of the respective contact pairs 13 and 14 form parts of an assembly indicated generally at 26. This assembly comprises a generally rectangular supporting member 27 formed of Bakelite or other suitable insulating material, which is adapted to be mounted upon the supporting legs 21a and 21b of the member 18 by means of rivets extending through the rivet openings 27a of this member and registering rivet openings in the ears 21c and 21d, respectively, provided at the upper ends of the supporting legs 21a and 21b. Specifically, the stationary contacts 13b and 14b are supported by conductive contact members 28 and 29 in a position within the member 27 to engage the movable contacts 13a and 14a, respectively. Additional conductive terminal parts 30 and 31 suitably threaded to receive terminal screws are provided for making connections with the source 11 and the windings of the motor. These parts, together with the contact carrying members 28 and 29, are secured to the support 27 by rivets.

As best shown in Figs. 4, 5, 6 and 9 of the drawings, the heating element 17 forms a part of a separate subassembly indicated generally at 33 which may be easily detached from and supported upon the support 27 through suitable manipulation of the clamping screws 37. In brief, this subassembly comprises an elongated support 34, preferably formed of mica or another heat resistant insulating material, provided at its center with a longitudinally extending slot 34b. The heating element is provided with a middle supporting portion 17a of the configuration best shown in Fig. 6 of the drawings, which projects through the slot 34b from the underside of the support 34 to receive the middle leg 36a of an E-shaped locking member 36. After the part 17a has been inserted through the slot 34b, the center leg 36a of the locking part 36 may be engaged therewith and bent upwardly to anchor the heater 17 against removal from the supporting member 34. At its ends the heating element is provided with looped end portions 17b and 17c which are adapted to be clamped between the supporting member 34 and the terminal parts 30 and 29 incident to manipulation of the screws 37 to mount the heater subassembly 33 upon the supporting member 27. Between the end and middle portions of the heating element, this element is provided with serpentine heat radiating portions 17d and 17e which are laterally displaced from the underside of the supporting member 34 to closely overlie the mid-portions of the thermostatic elements 15 and 16. For the purpose of directing heat radiated from the heating element 17 toward the supporting member 34 back toward the thermostatic elements 15 and 16, a reflector plate 35 is provided at the underside of the member 34 to overlie the heating element. The edges of this plate are bent over to embrace the recessed edges of the member 34, thereby to lock the reflector plate against movement longitudinally of the support member and to prevent removal thereof from the support member. As best shown in Figs. 4 and 6 of the drawings, this plate is provided with a center aperture 35b through which the mid-portion of the heating element extends and with recessed end portions 35c and 35d through which the end portions 17b and 17c of the heating element may pass, thus preventing contact between the heater element and the reflector plate.

From the preceding explanation it will be understood that in the operation of the relay, the heating element 17 is traversed by the current delivered to a motor 10 with which it is operatively associated, and that the heat output thereof varies as the square of the magnitude of this current. Specifically, the heating element 17 is initially energized in a circuit which includes the overload contacts 14 and the running winding 10a of the motor as one branch thereof, and the contacts 13 in series with the start winding 10b and condenser 10c as a second branch thereof. The heat thus developed and radiated by the element 17 serves to build up a temperature gradient longitudinally of the thermostatic elements 15 and 16 which is of the general pattern indicated by the curves A shown in Figs. 10 and 11 of the drawings. The build-up of this temperature gradient longitudinally of the strip 15 requires a finite time interval which, by appropriate adjustment of the biasing spring 23, may be made to substantially equal the motor starting period during which energization of the starting winding 10b is required. As this temperature gradient is built up, stresses are produced in the thermostatic strip 15 which tend to move the mid-portion of this strip downwardly against the opposing forces resulting from the action of the spring 23 and the stress imposed upon the strip longitudinally thereof. When the forces resulting from the temperature gradient along the strip slightly exceed the described opposing forces, the mid-portion of the strip moves away from the stationary contact 13b until a point is reached at which the longitudinal stresses assist in continuing this movement. From this point on, the mid-portion of the strip 15 and the contact 13a move with accelerated speed until the lower end of the contact 13a engages the stop 21h. Preferably, the stationary contact 13b is designed to follow the movement of the contact 13a until the described snap acting motion of the latter contact is started, at which time the two contacts are separated. Incident to the opening of these contacts, the starting winding 10b of the motor is obviously deenergized. During continued operation of the motor, the heating element 17 is obviously energized by the current traversing the running winding 10a thereof to develop heat which maintains the described temperature gradient along the thermostatic element 15 and thus prevents this element from returning to its closed position.

As will be apparent from the preceding explanation, the thermostatic element 15 is controlled through adjustment of the tension in the spring 23 to move to its open circuit position at a heater temperature substantially less than that required to produce corresponding movement of the thermostatic element 16. Specifically, the biasing spring 22 is so adjusted that so long as the temperature of the winding 10a, as indicated by the temperature gradient along the strip 16 and produced as a joint function of the ambient temperature and the magnitude of current flow through the heater 17, does not exceed a predetermined value, this strip will maintain its closed circuit setting. In the normal use of the relay, therefore, the thermostatic element 16 is not operated to open the contacts 14 through which current is delivered to the motor 10. Should, however, the temperature gradient developed longitudinally of this element indicate an overheated condition of the motor 10, or more specifically the winding 10a, the mid-portion of this strip will be laterally deflected away from the stationary contact element 14b to produce snap separation of the contacts 14 in the exact manner explained above with reference to the thermostatic element 15. Incident to separation of the contacts 14, the circuit for energizing the motor 10 is obviously interrupted and the heating element 17 is deenergized. As the heating element cools, the stresses restraining the thermostatic elements 15 and 16 in their open circuit positions are gradually relieved and finally the mid-portions of these elements are snapped back to their respective closed circuit positions. In this regard it is noted that during the cooling period, the mid-portion of the thermostatic element 15 should be snapped back to its closed circuit position to re-prepare the circuit for energizing the starting winding 10b before the overload cutout element 16 snaps back to its closed circuit position. This desired sequence of closing the contacts 13 ahead of the contacts 14 may be obtained in any one of several ways. For example, if more longitudinal stress is imposed upon the strip 15 than upon the strip 16, this sequence will be obtained. It may also be obtained by providing a greater amount of contact movement in the overload strip 16 than in the strip 15. Assuming that the on-off switch for the motor is not opened following the described overload cutout operation of the strip 16, the motor is obviously restarted in response to reclosing of the contacts 14. Further, if the overload condition persists, the described sequence of operations is repeated on a cyclic basis until such time as the on-off switch is operated to de-energize the motor or the overload imposed upon the motor is removed.

Referring now more particularly to the manner in which the described response characteristics of the two elements 15 and 16 are obtained, reference is made to applicant's Patent No. 2,332,518, granted October 26, 1943 for a full explanation thereof. As there pointed out, with the end portions of the strip 15 restrained against both angular and lateral deflection, heating of the strip at various points along the length thereof will produce deflection of the mid-portion of the strip in opposite directions. Thus, if the strip is heated locally at any point within the end zones $a$ and $b$ thereof, as shown in Fig. 10 of the drawings, the resulting forces developed in the strip tend to deflect the mid-portion of the strip upwardly from the illustrated position thereof. On the other hand, if the strip is heated locally at a point within its center zone $c$, forces are developed in the strip which tend to move the mid-portion thereof downward. Specifically, the response of the mid-portion of the strip to a given temperature rise at any point along the strip may be represented by the curve B, the various points of which indicate the direction, as well as the magnitude of mid-point deflection of the strip which is produced for a given increment of temperature change applied to that portion of the strip associated with any particular ordinate of the curve B. The net sum or integral of the forces tending to produce lateral deflection of the strip mid-point is obviously equal to the integral of the product of the ordinates of curve B and the temperature change associated therewith. From an inspection of this curve, it will be apparent that for a strip of unvarying cross-section and so long as the strip is of uniform temperature, the integral of the forces tending to produce downward deflection of the strip mid-point, as represented by the area beneath the portion c of the curve, exactly equals the integral of the forces tending to produce upward deflection of the strip mid-point, as represented by the combined areas beneath the parts a and b of the curve. Hence, so long as the temperature of the strip is varied uniformly throughout its length, as, for example, by ambient temperature changes in the air or other media surrounding the strip, no deflection of the strip mid-portion occurs in either direction. In other words, by providing a strip 15 of uniform cross-sectional configuration throughout its length, and by rigidly anchoring the end portions of this strip against both angular and lateral movement, a thermostatic element is provided which is fully compensated against any appreciable response as a result of ambient temperature changes.

To consider the manner in which lateral movement of the strip mid-portion is produced in response to the temperature gradient set up longitudinally of the strip through the action of the heating element 17, it is pointed out above that this temperature gradient may be generally represented by the curve A which indicates that the temperature of the mid-portion C of the strip is substantially higher than that of the end portions a and b. The particular configuration of this curve will, of course, depend upon several factors, including the spacing between the heating element 17 and the strip, the design of the heating element, the magnitude of current traversing this element, the surface finish, the specific heat and conductivity of the strip material, and the cross-sectional dimensions of the strip. In the theoretical case where the strip can be considered to be relatively long, where heat input is concentrated at a single point at the center and where it may be assumed that heat loss from any particular portion of the strip to the surroundings is proportional to the difference in temperature between such portion and the surroundings, this curve would be a true exponential curve, i. e. of the type $T = T_0 \Sigma^{-Kx}$, in the final steady state equilibrium condition. However, even in this case, the temperature distribution during the important transient condition, where heat capacity must be taken into account, cannot be represented by such a relatively simple algebraic expression. The important fact to observe, however, is that substantially no temperature gradient is produced along the portions a and b of the strip, whereas a high temperature gradient is present in the mid-portion c of the strip. By reference to the curve B, it will also be apparent that the temperature gradient resulting from operation of the heating element 17 tends to produce downward deflection of the strip mid-portion. The total force tending to produce downward deflection of the strip mid-portion is equal to the integral of the product curve C, which is obtained by multiplying the values represented by the curves A and B at the various points therealong. This product curve is of negligible value over the portions a and b of the strip where no appreciable temperature increase occurs. It is, however, of appreciable value in the mid-region c of the strip wherein the strip temperature gradient is appreciable. Obviously, so long as the total forces developed within the strip as a result of the action of the heating element 17, and as represented by the area beneath the curve C within the region c thereof, do not exceed the opposing forces produced by longitudinally stressing the strip and through the action of the biasing spring 23, the mid-portion of the strip will not be laterally deflected to its open circuit position. When, however, the predominance of these forces is reversed, the mid-portion of the strip is snapped to its open circuit position in the manner explained above. By appropriately proportioning the various described factors, this snap acting open circuit movement of the strip mid-portion is obtained after a heating interval substantially equal to the desired starting period of the motor 10.

Referring now more particularly to Fig. 11 of the drawings, the characteristics A, B and C, corresponding to those shown in Fig. 10, are there shown for the thermostatic strip 16. As there illustrated by the changed configuration of the curve B, the effect of tapering or reducing the width of the strip from its mid-portion toward its end portions is to reduce the tendency to produce upward deflection of the strip mid-portion when the end zones a and b of the strip are increased in temperature to decrease the lengths of these zones, and to increase the tendency to produce downward deflection of the strip mid-portion when any point along the increased center portion c of the strip is increased in temperature. Obviously, the area beneath the portion c of the curve B is greater than the combined areas beneath the portions a and b of the curve. It follows, therefore, that a uniform temperature change longitudinally of the strip will produce a resulting deflection of the strip mid-portion. Specifically, an increase in temperature throughout the strip will tend to effect downward deflection of the strip and vice versa. Obviously, in the applied form herein described, no deflection of the strip will occur so long as the opposing forces produced by longitudinally stressing the strip and through the action of the biasing spring 22 exceed the total downward deflecting forces as represented by the area beneath the curve C when a particular temperature gradient exists along the strip. This temperature gradient obviously changes with changes in the magnitude of current flow through the heating element 17. For example, when this current assumes a dangerous overload value, the temperature gradient may assume the configuration illustrated by the dash line curve A1 to produce a corresponding increase in the area beneath the resulting product curve C1. This increase in the forces tending to produce downward deflection of the strip mid-portion may, by appropriate adjustment of the spring 22, be sufficient to produce the described snap acting movement of the strip mid-portion to its open circuit position.

From the foregoing explanation it will be apparent that the present improved relay structure is relatively simple, and that only two means of adjustment have been provided. On the basis of usual manufacturing and assembly procedures, important variations will not be encountered except for those parts in respect to which the two adjustments are provided. These adjustments should be made only at the factory at the time of initial assembly of the relay, following which the relay should be sealed against tampering, since no further adjustment should be necessary. The proper amount of snap action of the two thermostatic strips is obtained in the manner explained above by including an experimentally determined amount of offset between the rivet holes at the ends of each strip as compared with the mating rivet holes in the supporting legs to which the strips are riveted. The supporting legs of the member 18 includes sufficient longitudinal resilience so that slight variations in the offset dimensions will not produce an effect of too much consequence, although further resilience can be introduced into the structure by providing several pairs of lateral kinks in the thermostatic strips. At this point it may be pointed out that, if desired, the surfaces of the thermostatic strips may be oxidized or otherwise coated immediately adjacent the heating element to permit maximum heat absorption of the heat radiated by the heating element along the middle zones of the strips, thereby to increase the thermostatic coupling between this element and the strip mid-portions without requiring a too critical physical spacing between the same.

The two adjustments mentioned above are obtained by (1) providing the elliptical spring biasing arrangement of frictionless construction in association with each strip and providing associated adjusting screws for changing the biasing force exerted by these springs upon the thermostatic strip mid-portions; and (2) by providing a readily replaceable heater structure which permits variation in the characteristics of the various types of motors to which the relay may be applied. In the latter regard it should be observed that the heater structure must, in each case, be designed to perform satisfactorily with a particular type of motor, i. e. the thickness of the heater wire, the number of heater wire turns, the spacing between the segments of the wire, the heater element configuration, and the relative location between the element and the thermostatic strips, must be such that the composite time constant of the heating element and associated thermostatic strips is properly related to the time constant of the particular type of motor to which the relay is to be applied. Such a construction permits the use of an identical structure, exclusive of the heater assembly, for all types of motors within the contact rating of the relay. Thus, to adapt a relay originally intended for use in controlling a small motor to the control of a large motor, it is only necessary to substitute one heating assembly for another.

In the final adjustment of each relay before shipment, the relay should be supported in the same position relative to gravitational forces as will be employed in the final installation. Gravitational forces affect the operation of the device in two ways. First, if the unit is so mounted that the flat surfaces of the thermostatic strips are parallel to the earth's surface, as in Fig. 3, the strips will snap either up or down in response, not only to temperature gradients along their lengths, but also in response to gravitational forces acting on the mass constituting the central portion of the strip and the contact element riveted to this portion. Secondly, air convection currents, resulting from a temperature difference existing between the heating element and its surrounding zones, will affect the temperature rise of the strips along with the heat radiated by the heating element. The radiated heat will have the same effect on the strips irrespective of orientation of the relay relative to gravitational forces. However, the temperature rise of the strip due to air convection currents will vary with changed orientation of the device relative to gravitational forces. Thus, for reliably accurate performance of the relay, it is desirable to make the final relay adjustments with the relay in the same position relative to gravitational forces as it will occupy in use.

While there have been described what are at present considered to be the preferred embodiments of the invention, it will be understood that various modifications may be made therein which are within the true spirit and scope of the invention as defined in the appended claims.

I claim:

1. A thermostatic relay for controlling a current consuming device, comprising a pair of elongated thermostatic strips one of which is of uniform cross-sectional configuration throughout its length and the other of which is of decreasing width from its center toward its ends, supporting means confining a first portion of each strip against both angular and lateral motion and restraining a second portion of each strip longitudinally removed from the first portion against both angular and lateral motion, whereby said one strip is compensated against lateral movement in response to ambient temperature changes and lateral movement of said other strip is produced in response to ambient temperature changes, circuit control contacts controlled by lateral movement of said one strip, additional circuit control contacts controlled by lateral movement of said other strip, and heating means adapted to be energized in accordance with the current traversing a controlled device for producing a temperature gradient along said strips, thereby to effect contact actuating lateral movement of said strips.

2. A thermostatic relay for controlling a current consuming device, comprising a pair of elongated thermostatic strips, supporting means for supporting said strips in side-by-side relationship and including provisions for restraining each end portion of each strip against both angular and lateral motion, one of said strips being of uniform cross-sectional configuration throughout its length such that it is substantially non-responsive to uniform changes in temperature throughout its length, the other of said strips being of non-uniform cross-sectional configuration throughout its length such that it responds to uniform ambient temperature changes throughout its length and also to localized temperature changes of the mid-portion thereof, circuit control contacts controlled by lateral movement of a mid-portion of said one strip, additional circuit control contacts controlled by lateral movement of a mid-portion of the other strip, and heating means adapted to be energized in accordance with the current traversing a controlled device for heating said strips locally adjacent said mid-portions thereof, thereby to produce contact actuating lateral movement of said mid-portions of said strips when said mid-portions of said strips are heated to predetermined temperatures.

3. A thermostatic relay for controlling a current consuming device, comprising a pair of elongated thermostatic strips, means supporting said strips in side-by-side relationship and including provisions for restraining each end portion of each strip against both angular and lateral motion and for stressing said strips longitudinally thereof to provide for accelerated over center movement thereof when the mid-portions thereof are heated to predetermined temperatures, one of said strips being of substantially uniform cross-sectional configuration throughout its length such that it is substantially non-responsive to uniform changes in temperature throughout its length, the other of said strips being of non-uniform cross-sectional configuration throughout its length such that it responds to uniform ambient temperature changes throughout its length and also to localized temperature changes of the mid-portion thereof, circuit control contacts controlled by lateral movement of the mid-portion of said one strip, additional circuit control contacts controlled by lateral movement of the mid-portion of the other strip, and heating means adapted to be energized in accordance with the current traversing a controlled device for heating said strips locally adjacent said mid-portions thereof, thereby to produce contact actuating lateral movement of said mid-portions of said strips when said mid-portions of said strips are heated to said predetermined temperatures.

4. A thermostatic relay for controlling a current consuming device, comprising a pair of elongated thermostatic strips, means supporting said strips in side-by-side relationship and including provisions for restraining each end portion of each strip against both angular and lateral motion and for stressing said strips longitudinally thereof to provide for accelerated over center movement thereof when the mid-portions thereof are heated to predetermined temperatures, one of said strips being of substantially uniform cross-sectional configuration throughout its length such that it is substantially non-responsive to uniform changes in temperature throughout its length, the other of said strips being of non-uniform cross-sectional configuration throughout its length such that it responds to uniform ambient temperature changes throughout its length and also to localized temperature changes of the mid-portion thereof, circuit control contacts controlled by lateral movement of the mid-portion of said one strip, additional circuit control contacts controlled by lateral movement of the mid-portion of the other strip, heating means adapted to be energized in accordance with the current traversing a controlled device for heating said strips locally adjacent said mid-portions thereof, thereby to produce contact actuating lateral movement of said mid-portions of said strips when said mid-portions of said strips are heated to said predetermined temperatures, frictionless springs individual to said strips for opposing said lateral movement of said mid-portions thereof, and means for adjusting the tension in each of said springs.

5. A thermostatic relay for controlling a current consuming device, comprising a pair of elongated thermostatic strips, means supporting said strips in side-by-side relationship and including provisions for restraining each end portion of each strip against both angular and lateral motion and for stressing said strips longitudinally thereof to provide for accelerated over center movement thereof when the mid-portions thereof are heated to predetermined temperatures, one of said strips being of substantially uniform cross-sectional configuration throughout its length such that it is substantially non-responsive to uniform changes in temperature throughout its length, circuit control contacts controlled by lateral movement of the mid-portion of said one strip, the other of said strips being of non-uniform cross-sectional configuration throughout its length such that it responds to uniform ambient temperature changes throughout its length and also to localized temperature changes of the mid-portion thereof, additional circuit control contacts controlled by lateral movement of the mid-portion of the other strip, heating means adapted to be energized in accordance with the current traversing a controlled device for heating said strips locally adjacent said mid-portions thereof, thereby to produce contact actuating lateral movement of said mid-portions of said strips when said mid-portions of said strips are heated to said predetermined temperatures, spring loops individual to said strips and stressed transversely of the lengths thereof between said mid-portions of said strips and said supporting means to oppose said lateral movement of said strip mid-portions, and means for individually adjusting the stress in said spring loops.

6. A thermostatic relay for controlling a current consuming device, comprising a supporting member provided with a base and three sets of laterally disposed supporting parts, a pair of elongated thermostatic strips arranged in side-by-side relationship and spanning the gaps between the opposed parts of two of said sets, means rigidly connecting the end portions of said strips to their respective associated supporting parts to restrain said end portions against both angular and lateral motion, said strips being disposed to move laterally toward said base when heated along the mid-portions thereof and one of said strips being of substantially uniform cross-sectional configuration throughout its length such that it is substantially non-responsive to uniform changes in temperature throughout its length, the other of said strips being of non-uniform cross-sectional configuration throughout its length such that it responds to uniform ambient temperature changes throughout its length, a heater and contact support mounted upon the third set of laterally disposed supporting parts, a heater carried by said support and overlying the mid-portions of said strips, said heater being adapted for energization by the current delivered to a controlled current consuming device, thereby to produce lateral movement of said mid-portions of said strips toward said base, normally engaged contacts respectively carried by said support and the mid-portion of said one strip and adapted for disengagement in response to a predetermined lateral movement of the mid-portion of said one strip toward said base, and additional normally engaged contacts respectively carried by said support and the mid-portion of the other strip and adapted for disengagement in response to a predetermined lateral movement of the mid-portion of said other strip toward said base.

7. A thermostatic relay for controlling a current consuming device, comprising a supporting member provided with a base and three sets of laterally disposed supporting parts, a pair of elongated thermostatic strips arranged in side-by-side relationship and spanning the gaps between the opposed parts of two of said sets, means rigidly connecting the end portions of said strips to their respective associated supporting parts to restrain said end portions against both angular and lateral motion, said strips being disposed to move laterally toward said base when heated along the mid-portions thereof and one of said strips being of substantially uniform cross-sectional configuration throughout its length such that it is substantially non-responsive to uniform changes in temperature throughout its length, the other of said strips being of non-uniform cross-sectional configuration throughout its length such that it responds to uniform ambient temperature changes throughout its length, a heater and contact support mounted upon the third set of laterally disposed supporting parts, a heating element carried by said support and overlying the mid-portions of said strips, said heater being adapted for energization by the current delivered to a controlled current consuming device, thereby to produce lateral movement of said mid-portions of said strips toward said base, normally engaged contacts respectively carried by said support and the mid-portion of said one strip and adapted for disengagement in response to a predetermined lateral movement of the mid-portion of said one strip toward said base, additional normally engaged contacts respectively carried by said support and the mid-portion of the other strip and adapted for disengagement in response to a predetermined lateral movement of the mid-portion of said other strip toward said base, elliptical springs individual to said strips and stressed transversely of the lengths thereof between said mid-portions of said strips and the base of said supporting member to oppose said lateral movement of said strip mid-portions, and means for individually and adjustably stressing said springs.

LUDVIK J. KOCI.

REFERENCES CITED

The following references are of record in the file of this patent:

UNITED STATES PATENTS

| Number | Name | Date |
|---|---|---|
| 1,120,259 | Weigand | Dec. 8, 1914 |
| 1,549,773 | Hynes | Aug. 18, 1925 |
| 1,565,539 | Woodson | Dec. 15, 1925 |
| 1,710,512 | Pitt | Apr. 23, 1929 |
| 1,864,483 | Cohn-Byk et al. | June 21, 1932 |
| 1,919,975 | Chapman | July 25, 1933 |
| 2,316,699 | Myers | Apr. 13, 1943 |
| 2,332,518 | Koci | Oct. 26, 1943 |
| 2,343,862 | Christensen | Mar. 14, 1944 |
| 2,367,028 | Jacobs | Jan. 9, 1945 |
| 2,379,602 | Stickel | July 3, 1945 |

FOREIGN PATENTS

| Number | Country | Date |
|---|---|---|
| 554,482 | Germany | July 11, 1932 |